US006922445B1

United States Patent
Sampath et al.

(10) Patent No.: US 6,922,445 B1
(45) Date of Patent: Jul. 26, 2005

(54) METHOD AND SYSTEM FOR MODE ADAPTATION IN WIRELESS COMMUNICATION

(75) Inventors: Hemanth Sampath, Palo Alto, CA (US); Peroor K. Sebastian, Mountain View, CA (US); Arogyaswami J. Paulraj, Stanford, CA (US)

(73) Assignee: Intel Corporation, Santa Clara, CA (US)

( * ) Notice: Subject to any disclaimer, the term of this patent is extended or adjusted under 35 U.S.C. 154(b) by 852 days.

(21) Appl. No.: 09/609,591

(22) Filed: Jun. 30, 2000

Related U.S. Application Data

(63) Continuation-in-part of application No. 09/585,948, filed on Jun. 2, 2000, now Pat. No. 6,298,092, which is a continuation-in-part of application No. 09/464,372, filed on Dec. 15, 1999, now Pat. No. 6,351,499.

(51) Int. Cl.$^7$ .............................. H04B 7/02; H04L 1/02
(52) U.S. Cl. ...................... 375/267; 455/132; 455/101; 375/299; 375/347
(58) Field of Search ......................... 375/267; 370/310; 455/103; 342/367

(56) References Cited

U.S. PATENT DOCUMENTS

| | | | |
|---|---|---|---|
| 5,815,488 A | | 9/1998 | Williams et al. |
| 5,933,421 A | | 8/1999 | Alamouti et al. |
| 5,991,613 A | * | 11/1999 | Euscher et al. ........... 455/277.1 |
| 6,031,831 A | * | 2/2000 | Tan Boon et al. .......... 370/342 |
| 6,058,105 A | | 5/2000 | Hochwald et al. .......... 370/310 |
| 6,064,662 A | | 5/2000 | Gitlin et al. |
| 6,085,076 A | * | 7/2000 | Lindsay et al. ........... 455/277.1 |
| 6,097,771 A | | 8/2000 | Foschini ...................... 375/346 |
| 6,131,016 A | * | 10/2000 | Greenstein et al. ........... 455/69 |
| 6,144,711 A | | 11/2000 | Raleigh et al. |
| 6,173,005 B1 | * | 1/2001 | Kotzin et al. ................ 375/141 |
| 6,175,550 B1 | | 1/2001 | Van Nee ...................... 370/206 |

FOREIGN PATENT DOCUMENTS

| | | | |
|---|---|---|---|
| EP | 0951091 A2 | 10/1999 | ............ H01Q/3/26 |
| WO | WO 98/09381 | 3/1998 | |
| WO | WO98/09385 | 3/1998 | ............ H04B/7/02 |

OTHER PUBLICATIONS

Paulraj, A., *Taxonomy of space–time processing for wireless networks*, IEE Proc—Radar Sonar Navig., vol. 145, No. 1, Feb. 1998.

* cited by examiner

*Primary Examiner*—Stephen Chin
*Assistant Examiner*—Harry Vartanian
(74) *Attorney, Agent, or Firm*—Michael A. Proksch

(57) ABSTRACT

A method and system for selective mode adaptation for transmitting data by spatial multiplexing applicable in communications systems with a transmit unit having multiple transmit antennas or multiple transmit units and a receive unit having multiple receive antennas. A channel descriptor, such as channel matrix H or a channel matrix filter $\mathcal{H}$, with has sub-descriptors corresponding to the transmit antennas is determined and a quality parameter, such as signal-to-interference and noise ratio, signal-to-noise ratio or power level are chosen. The quality parameter is assigned a threshold and the sub-descriptor or sub-descriptors whose quality parameters do not meet the threshold are identified and deactivated.

42 Claims, 6 Drawing Sheets

METHOD AND SYSTEM FOR MODE ADAPTATION IN WIRELESS COMMUNICATION

RELATED APPLICATIONS

This patent application is a continuation-in-part of patent application Ser. No. 09/464,372 filed on Dec. 15, 1999, now U.S. Pat. No. 6,351,499 and of patent application Ser. No. 09/585,948 filed on Jun. 2, 2000 now U.S. Pat. No. 6,298,092 which are herein incorporated by reference.

FIELD OF THE INVENTION

The present invention relates generally to wireless communication systems and methods, and more particularly to mode adaptation including selection of transmit antennas in transmit units employing multiple antennas for spatial multiplexing.

BACKGROUND OF THE INVENTION

Wireless communication systems serving stationary and mobile wireless subscribers are rapidly gaining popularity. Numerous system layouts and communications protocols have been developed to provide coverage in such wireless communication systems.

Wireless communications channels between transmit and receive devices are inherently variable and their quality fluctuates.

Specifically, the quality parameters of such communications channels vary in time. Under good conditions wireless channels exhibit good communication parameters, e.g., large data capacity, high signal quality, high spectral efficiency and throughput. At these times significant amounts of data can be transmitted via the channel reliably. However, as the channel changes in time, the communication parameters also change. Under altered conditions former data rates, coding techniques and data formats may no longer be feasible. For example, when channel performance is degraded the transmitted data may experience excessive corruption yielding unacceptable communication parameters. For instance, transmitted data can exhibit excessive bit-error rates or packet error rates. The degradation of the channel can be due to a multitude of factors such as general noise in the channel, multi-path fading, loss of line-of-sight path, excessive Co-Channel Interference (CCI) and other factors.

By reducing CCI the carrier-to-interference (C/I) ratio can be improved and the spectral efficiency increased. Specifically, improved C/I ratio yields higher per link bit rates, enables more aggressive frequency re-use structures and increases the coverage of the system.

It is also known in the communication art that transmit units and receive units equipped with antenna arrays, rather than single antennas, can improve receiver performance. Antenna arrays can both reduce multipath fading of the desired signal and suppress interfering signals or CCI. Such arrays can consequently increase both the range and capacity of wireless systems. This is true for wireless cellular telephone and other mobile systems as well as Fixed Wireless Access (FWA) systems.

In mobile systems, a variety of factors cause signal degradation and corruption. These include interference from other cellular users within or near a given cell. Another source of signal degradation is multipath fading, in which the received amplitude and phase of a signal varies over time. The fading rate can reach as much as 200 Hz for a mobile user traveling at 60 mph at PCS frequencies of about 1.9 GHz. In such environments, the problem is to cleanly extract the signal of the user being tracked from the collection of received noise, CCI, and desired signal portions summed at the antennas of the array.

In FWA systems, e.g., where the receiver remains stationary, signal fading rate is less than in mobile systems. In this case, the channel coherence time or the time during which the channel estimate remains stable is longer since the receiver does not move. Still, over time, channel coherence will be lost in FWA systems as well.

Antenna arrays enable the system designer to increase the total received signal power, which makes the extraction of the desired signal easier. Signal recovery techniques using adaptive antenna arrays are described in detail, e.g., in the handbook of Theodore S. Rappaport, *Smart Antennas, Adaptive Arrays, Algorithms, & Wireless Position Location*; and Paulraj, A. J. et al., "Space-Time Processing for Wireless Communications", IEEE Signal Processing Magazine, November 1997, pp. 49–83.

Prior art wireless systems have employed adaptive modulation of the transmitted signals with the use of feedback from the receiver as well as adaptive coding and receiver feedback to adapt data transmission to changing channel conditions. However, effective maximization of channel capacity with multiple transmit and receive antennas is not possible only with adaptive modulation and/or coding.

In U.S. Pat. No. 5,592,490 to Barratt et al., U.S. Pat. No. 5,828,658 to Ottersten et al., and U.S. Pat. No. 5,642,353 Roy III, teach about spectrally efficient high capacity wireless communication systems using multiple antennas at the transmitter; here a Base Transceiver Station (BTS) for Space Division Multiple Access (SDMA). In these systems the users or receive units have to be sufficiently separated in space and the BTS uses its transmit antennas to form a beam directed towards each receive unit. The transmitter needs to know the channel state information such as "spatial signatures" prior to transmission in order to form the beams correctly. In this case spatial multiplexing means that data streams are transmitted simultaneously to multiple users who are sufficiently spatially separated.

The disadvantage of the beam-forming method taught by Barratt et al., Ottersten et al., and Roy III is that the users have to be spatially well separated and that their spatial signatures have to be known. Also, the channel information has to be available to the transmit unit ahead of time and the varying channel conditions are not effectively taken into account. Finally, the beams formed transmit only one stream of data to each user and thus do not take full advantage of times when a particular channel may exhibit very good communication parameters and have a higher data capacity for transmitting more data or better signal-to-noise ratio enabling transmission of data formatted with a less robust coding scheme.

U.S. Pat. No. 5,687,194 to Paneth et al. describes a Time Division Multiple Access (TDMA) communication system using multiple antennas for diversity. The proposed system exploits the concept of adaptive transmit power and modulation. The power and modulation levels are selected according to a signal quality indicator fed back to the transmitter.

Addressing the same problems as Paneth et al., U.S. Pat. No. 5,914,946 to Avidor et al. teaches a system with adaptive antenna beams. The beams are adjusted dynamically as the channel changes. Specifically, the beams are adjusted as a function of a received signal indicator in order to maximize signal quality and reduce the system interference.

The prior art also teaches using multiple antennas to improve reception by transmitting the same information, i.e., the same data stream from all antennas. Alternatively, the prior art also teaches that transmission capacity can be increased by transmitting a different data stream from each antenna. For more information about capacity increases achievable by transmitting different data streams from different antennas the reader is referred to U.S. Pat. No. 5,345,599 to Paulraj, A. J. et al., and to Foschini, G. J., "Layered Space-Time Architecture for Wireless Communication in a Fading Environment when Using Multi-Element Antennas", Bell Labs Technical Journal, Autumn 1996. These two approaches are commonly referred to as antenna diversity schemes and spatial multiplexing schemes.

Adaptive modulation and/or coding in multiple antenna systems involve mapping of data converted into appropriate symbols to the antennas of the transmit antenna array for transmission. In the case of spatial multiplexing there can be no coordination between transmitters, since the transmit antennas can belong to separate base stations or mobiles rather than to a single antenna array. Prior art systems do not teach rules suitable for determining antenna mappings, or, more precisely, antenna selection for varying channel conditions in the spatial multiplexing mode. Development of rules for selecting antennas in the spatial multiplexing mode would represent a significant advance in the art.

SUMMARY

The present invention provides a method for selecting antennas for transmitting data over a channel by employing spatial multiplexing, i.e., by transmitting different data streams from different antennas. The method is applicable in communications systems with a transmit unit having multiple transmit antennas or multiple transmit units, e.g., multiple transceiver stations, and a receive unit having multiple receive antennas. The first step of the method involves determining a channel descriptor. In one embodiment the descriptor is a channel matrix H. In another embodiment, where the channel is subject to time delay spread, the descriptor is a channel matrix filter $\mathcal{H}$. The channel descriptor has sub-descriptors corresponding to the transmit antennas. Specifically, channel matrix H has sub-descriptors in the form of sub-matrices $h_i$ corresponding to the transmit antennas. Channel matrix filter $\mathcal{H}$ has sub-descriptors in the form of sub-matrix filters $h_i$ also corresponding to the transmit antennas.

The method then calls for choosing a quality parameter and a threshold for the quality parameter. In the next steps, a sub-descriptor which does not meet the threshold is identified and the antenna from among the transmit antennas associated with the sub-descriptor is deactivated.

The quality parameter used in the method can be selected from among signal-to-interference and noise ratio, signal-to-noise ratio and power level. The threshold is typically a minimum acceptable value of the quality parameter. This threshold can be re-set or adjusted and the steps of identifying another sub-descriptor or set of sub-descriptors not meeting the threshold can be repeated. The corresponding transmit antennas are then deactivated.

In case the spatial multiplexed communication is of the type employing a number of sub-carrier tones rather than just one carrier frequency, the sub-descriptors are associated with an average value of the quality parameter. In particular, the average value is the average of the quality parameter over the sub-carrier tones. It is then this average value of the quality parameter which is compared with the threshold to determined whether the threshold is met.

In one embodiment of the method, the sub-matrix $h_j$ is removed from the channel matrix H to obtain a subset channel matrix H'. The remaining sub-matrices $h_i$ can be rearranged after removal of $h_j$. In particular, the remaining sub-matrices h can be ordered in accordance with the threshold, i.e., in descending order starting with the sub-matrix $h_i$ which exceeds the threshold the most or has the best quality parameter.

The data transmitted is typically coded and modulated in accordance with a selected mode. The mode is characterized by a coding rate and a modulation. The setting of the threshold can be based on the selected mode and the selected mode can be based on the quality parameter.

The receive unit can employ any receiver such as a maximum likelihood receiver, a zero forcing equalizer receiver, a successive cancellation receiver, a minimum mean square error equalizer (MMSE) receiver.

In another embodiment, a set of sub-descriptors, i.e., a set of sub-matrices $h_i$ or set of sub-matrix filters $h_i$ is identified and transmit unit antennas associated with that set are all deactivated at one time, rather than one by one. This method can be applied in steps as well. A set of antennas or a single antenna not meeting the assigned threshold can be deactivated in each step.

In still another embodiment, the transmit antennas belong to separate transmit units, e.g., to different base stations. In this case the sub-matrix $h_j$ can represent the base station transceiver which is to be deactivated to improve the quality parameter at the receive unit.

Systems of the invention can be used for spatial multiplexed communications between transmit units with multiple antennas and receive units with multiple antennas, or between separate transceivers, e.g., base stations, and receive units with multiple antennas. The receive unit has a channel estimation block for determining channel descriptor, a mode selection block for receiving the quality parameter, assigning a threshold to the quality parameter, and identifying among the sub-descriptors of the channel descriptor at least one sub-descriptor not meeting the threshold. The receive unit has a feedback unit for sending feedback related to the at least one sub-descriptor to the transmit unit or, as the case may be, to the base stations.

In case the transmit unit has an antenna array, a controller at the transmit unit receives the feedback and deactivates the corresponding transmit antennas. In case the transmit antennas belong to separate transceivers, a common controller or separate control units can be used to receive the feedback and deactivate the corresponding transceivers or their antennas.

The method of the invention can be employed in multi-tone communications using a number of sub-carrier tones for transmitting data from each transmit antenna.

A detailed description of the invention and the preferred and alternative embodiments is presented below in reference to the attached drawing figures.

DETAILED DESCRIPTION

Figure 1:
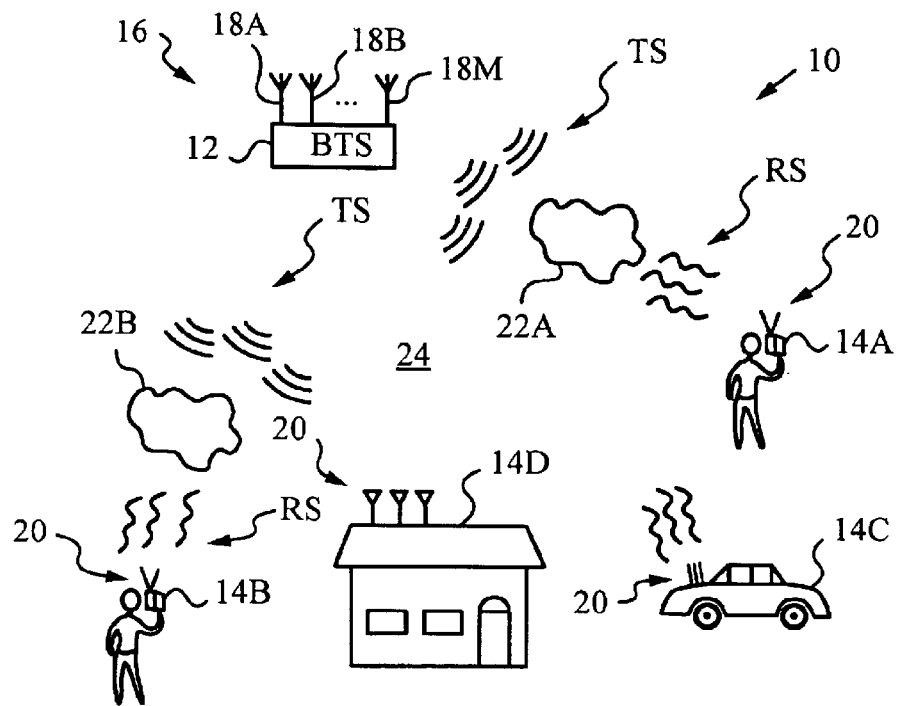
FIG. 1 is a simplified diagram illustrating a communication system in which the method of the invention is applied.
Figure 2:
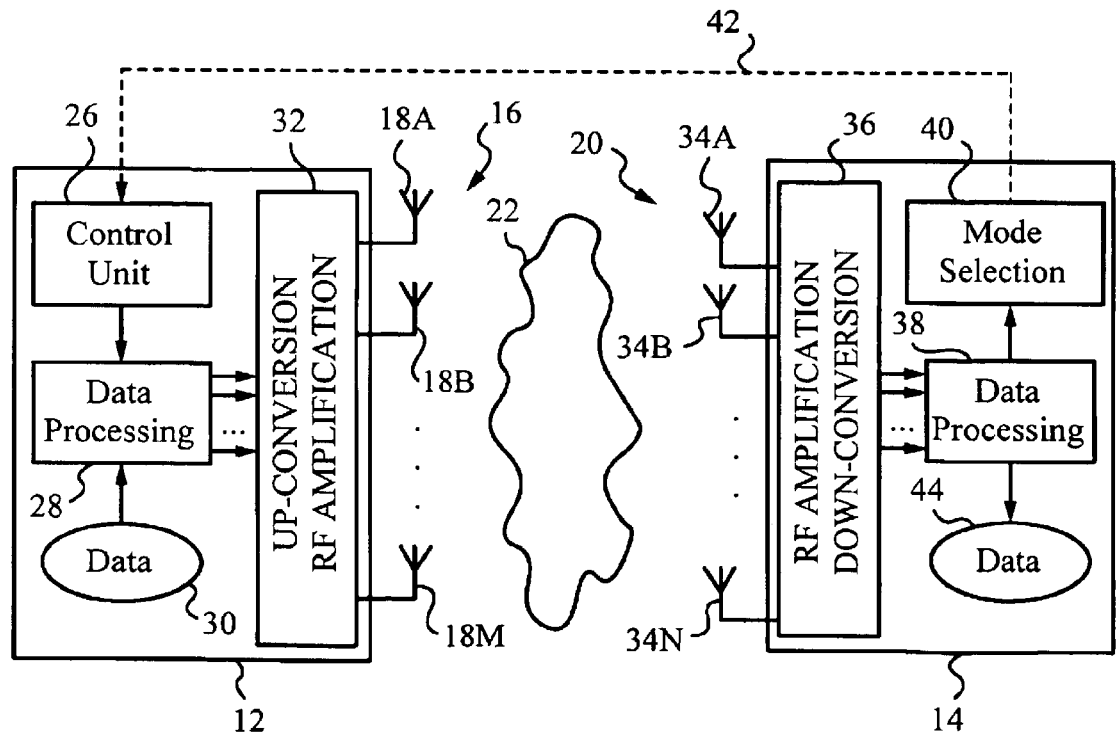
FIG. 2 is a simplified block diagram illustrating the transmit and receive units according to the invention.

The method and wireless systems of the invention will be best understood after first considering the high-level diagrams of FIGS. 1 and 2. FIG. 1 illustrates a portion of a wireless communication system 10, e.g., a cellular wireless system. For explanation purposes, the downlink communication will be considered where a transmit unit 12 is a Base Transceiver Station (BTS) and a receive unit 14 is a mobile or stationary wireless user device. Exemplary user devices include mobile receive units 14A, 14B, 14C which are portable telephones and car phones and a stationary receive unit 14D, which can be a wireless modem unit used at a residence or any other fixed wireless unit. Of course, the same method can be used in uplink communication from wireless units 14 to BTS 12.

BTS 12 has an antenna array 16 consisting of a number of transmit antennas 18A, 18B, ..., 18M. Receive units 14 are equipped with antenna arrays 20 of N receive antennas (for details see FIGS. 2, 3 and 5). BTS 12 sends transmit signals TS to all receive units 14 via channels 22A and 22B. For simplicity, only channels 22A, 22B between BTS 12 and receive units 14A, 14B are indicated, although BTS 12 transmits TS signals to all units shown. In this particular case receive units 14A, 14B are both located within one cell 24. However, under suitable channel conditions BTS 12 can transmit TS signals to units outside cell 24.

The time variation of channels 22A, 22B causes transmitted signals TS to experience fluctuating levels of attenuation, interference, multi-path fading and other deleterious effects. Therefore, communication parameters of channels 22A, 22B such as data capacity, signal quality, spectral efficiency or throughput undergo temporal changes. Thus, channels 22A, 22B can not at all times support efficient propagation of high data rate signals TS or signals which are not formatted with a robust coding algorithm.

In accordance with the invention, antenna array 16 at BTS 12 employs spatial multiplexing, reduces interference, increases array gain and achieves other advantageous effects. Antenna arrays 20 at receive units 14 are set up to receive the spatial multiplexed signals from BTS 12. The method of the invention finds an optimum choice of transmit antennas 18A, 18B, ..., 18M selected adaptively with changing conditions of channels 22A, 22B. In other words, the method of the invention implements an adaptive and optimal selection of transmit antennas 18A, 18B, ..., 18M, deactivating some of these antennas in accordance with the rules described below to improve performance.

FIG. 2 illustrates the fundamental blocks of transmit unit 12 and one receive unit 14 necessary to employ the method. Transmit unit 12 has a control unit 26 connected to a data processing block 28 for receiving data 30 to be converted to spatially multiplexed transmit signals TS to select transmit antennas 18A, 18B, ..., 18M for transmission therefrom. An up-conversion and RF amplification block 32 supplies the transmit signals TS to antennas 18A, 18B, ..., 18M.

On the other side of the link, receive unit 14 has N receive antennas 34A, 34B, ..., 34N in its array 20 for receiving receive signals RS. An RF amplification and down-conversion block 36 processes receive signals RS and passes them to data processing block 38, which generates a representation 44 of the originally transmitted data 30. Data processing block 38 includes a channel measurement or estimation unit (see FIG. 5) which obtains a measurement of the channel coefficients matrix H characterizing channel 22.

A mode selection block 40 uses matrix H and a chosen quality of service QoS or quality parameter QP to determine which of transmit antennas 18 should be deactivated to improve reception. The quality parameter QP used by block 40 can be any useful signal characteristics measure such as signal-to-interference and noise ratio (SINR), signal-to-noise ratio (SNR), power level. Block 40 makes the determination about which of transmit antennas 18A, 18B, ... 18M should be transmitting in order to keep the quality parameter above a certain minimum required value or threshold. This selection is fed back as indicated by dashed line 42 to transmit unit 12. In case channel 22 is a time-division duplexed (TDD) channel, which is reciprocal between the receive and transmit units, no separate feedback is required. In response, unit 26 switches off or deactivates the transmit antennas which block 40 has determined should be deactivated.

Figure 3:
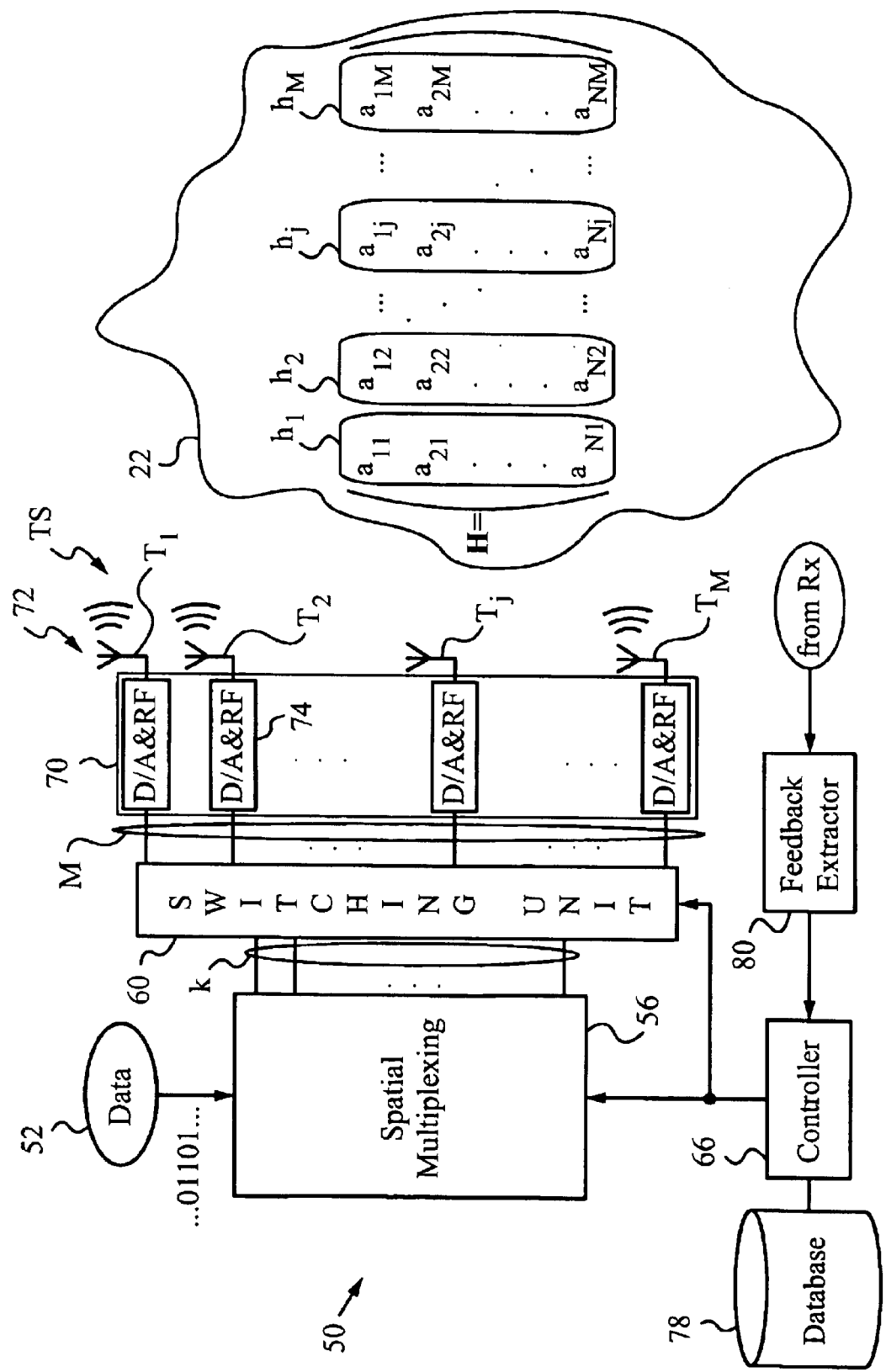
FIG. 3 is a block diagram of an exemplary transmit unit in accordance with the invention.

An exemplary embodiment of a transmit unit 50 for practicing the method of the invention is shown in FIG. 3. Data 52, in this case in the form of a binary stream, has to be transmitted.

Before transmission, data 52 may be interleaved and pre-coded by interleaver and pre-coder (not shown). The purpose of interleaving and pre-coding is to render the data more robust against terrors. Both of these techniques are well-known in the art.

Data 52 is delivered to a conversion unit, more specifically a spatial multiplexing block 56. Block 56 converts data 52 into k streams of symbols at chosen modulation rates and coding rates. For example, data 52 can be converted into symbols through modulation in a constellation selected from among PSK, QAM, GMSK, FSK, PAM, PPM, CAP, CPM or other suitable constellations. The transmission rate or throughput of data 52 will vary depending on the modulation and coding rates used in each of the k streams.

| Mode | Modulation Rate (bits/symbol) | Coding Rate | Throughput (bits/s/Hz) |
|---|---|---|---|
| 1 | 2 | 3/4 | 3/2 |
| 2 | 2 | 2/3 | 4/3 |
| 3 | 2 | 1/2 | 1 |
| 4 | 2 | 1/3 | 2/3 |
| 5 | 4 | 3/4 | 3 |
| 6 | 4 | 2/3 | 8/3 |
| 7 | 4 | 1/2 | 2 |
| 8 | 4 | 1/3 | 4/3 |
| 9 | 5 | 3/4 | 15/4 |
| 10 | 5 | 2/3 | 10/3 |
| 11 | 5 | 1/2 | 5/2 |
| 12 | 5 | 1/3 | 5/3 |
| 13 | 6 | 3/4 | 9/2 |
| 14 | 6 | 2/3 | 4 |
| 15 | 6 | 1/2 | 3 |
| 16 | 6 | 1/3 | 2 |

Table 1 illustrates some typical modulation and coding rates with the corresponding throughputs which can be used in the spatial multiplexing method of the invention. The entries are conveniently indexed by a mode number.

The mode column can be used to more conveniently identify the modulation and coding rates which are to be applied to the k streams. Tables analogous to Table 1 for other coding rates and modulation can be easily derived as these techniques are well-known in the art.

Once coded and modulated in symbols, data 52 passes to a switching unit 60. Depending on its setting, switching unit 60. routs modulated and coded k streams of spatially multiplexed data 52 to all or a subset of its M outputs. The M outputs lead to the corresponding M transmit antennas 72 via an up-conversion and RF amplification stage 70 having individual digital-to-analog converters and up-conversion/ RF amplification blocks 74. Transmit antennas 72 transmit data 52 in the form of transmit signals TS. In this case transmit antennas $T_1, T_2, \ldots T_M$ with the exception of transmit antenna $T_j$ are transmitting coded streams. In other words, k=M−1. The determination to deactivate antenna $T_j$ is made in accordance with the method of the invention as described below.

Transmit unit 50 also has a controller 66 connected to spatial multiplexing block 56 and to switching unit 60. A database 78 is connected to controller 66. Database 78 conveniently contains a table, e.g., a spatial multiplexing look-up table indexed by mode as in exemplary table 1. The convenience of indexing by mode resides in the fact that feedback to transmit unit 50 does not require much bandwidth.

Specifically, transmit unit 50 receives feedback from receive unit 90 (see FIG. 5) via a feedback extractor 80. Feedback extractor 80 detects an antenna number or any other designation which antennas to operate and which to deactivate and forwards this information to controller 66. In some embodiments feedback extractor detects mode number and associated antenna number, and forwards it to controller 66. Controller 66 looks up the mode number in database 78 and thus determines the modulation, coding rate and any other parameters for the associated antenna.

Receive unit 90 can send back a channel descriptor, e.g., a channel matrix H, a channel matrix filter $\mathcal{H}$ or some other suitable descriptor identifying the action of the channel on transmitted signals TS, to transmit unit 50. In these cases transmit unit 50 can use the channel descriptor in its operation to derive any information in addition to antenna number and mode number to adapt its transmission to channel 22. In the event of using time-division duplexing (TDD), the feedback information, i.e., the channel parameters are obtained during the reverse transmission from receive unit 90 or remote subscriber unit, as is known in the art, and no dedicated feedback extractor 80 is required.

When channel 22 experiences delay spread, it can be modeled as a Finite Impulse Response (FIR) channel, i.e., channel 22 has a memory and any representation of channel 22 should have a time dimension. Depending on the transmission symbol rate, for a given delay spread channel 22 will have some number L of symbol delay taps. When there is no delay spread channel 22 can be represented by an N×M matrix where N is the number of receive antennas 92 (see FIG. 5) and M is the number of transmit antennas 72. When there is delay spread, channel 22 can be represented by a matrix filter $\mathcal{H}$ which is constructed of $H_1, H_2, \ldots H_L$, where $H_i$ is the N×M channel matrix at i-th delay tap.

When multi-carrier modulation such as OFDM is used, the symbol duration is chosen much longer than the channel delay spread. In this case, each sub-carrier frequency or tone has an individual channel represented by an N×M matrix, i.e., $H_1, H_2, \ldots H_T$ where T is the number of sub-carrier tones.

In an embodiment of the invention where inter-symbol interference (ISI) is not a problem, the parameters of channel 22 are expressed by a single channel matrix H. In accordance with this descriptor, transmit signals TS propagating through channel 22 are affected by channel coefficients $a_{xy}$ of matrix H. Matrix H is composed of sub-matrices h, here in the form of columns labeled $h_1, h_2, \ldots, h_j, \ldots h_M$. Each antenna $T_1, T_2, \ldots T_j, \ldots, T_M$ is associated with a corresponding sub-matrix $h_1, h_2, \ldots, h_j, \ldots h_M$. The dimension or number of entries in each sub-matrix h is dictated by the number of receive antennas 92 employed by receive unit 90 (see FIG. 5); in this case the number is N. Hence, channel coefficients matrix H is an N×M matrix with channel coefficients $a_{xy}$ ranging from $a_{11}$ to $a_{NM}$.

Figures 4, 6:
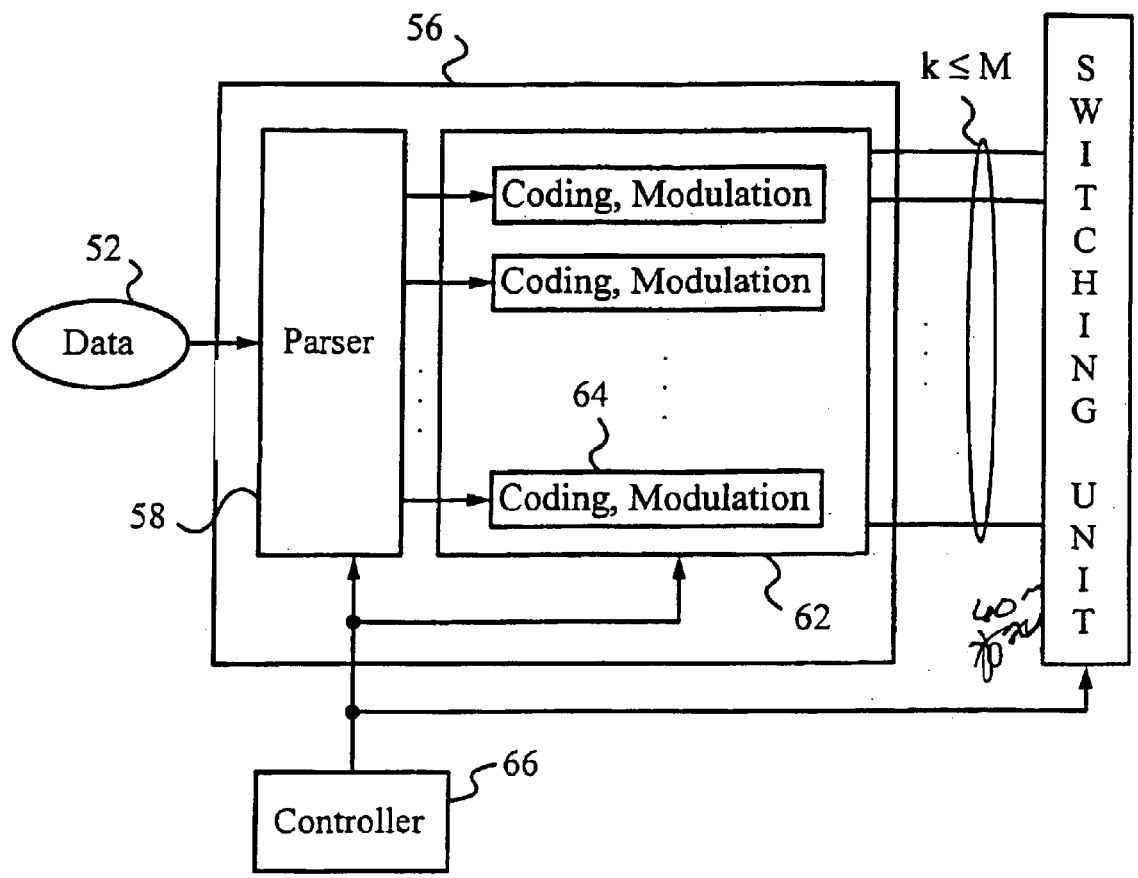
FIG. 4 is a block diagram of a spatial multiplexing block of the transmit unit of FIG. 3.
FIG. 6. is a schematic illustrating the operations performed on the channel matrix H.

FIG. 4 shows a more detailed block diagram of spatial multiplexing block 56. Data 52 received by block 56 is first parsed by parser 58, which is in direct communication with controller 66. Based on feedback obtained from feedback extractor 80, controller tells parser 59 into how many streams data 52 is to be divided. Parser is connected with a multiplexing block 62 and supplies the streams to its coding and modulation blocks 64. Having separate coding and modulation blocks 64 for each stream enables the user to employ different coding rates and modulations in each stream.

Figure 5:
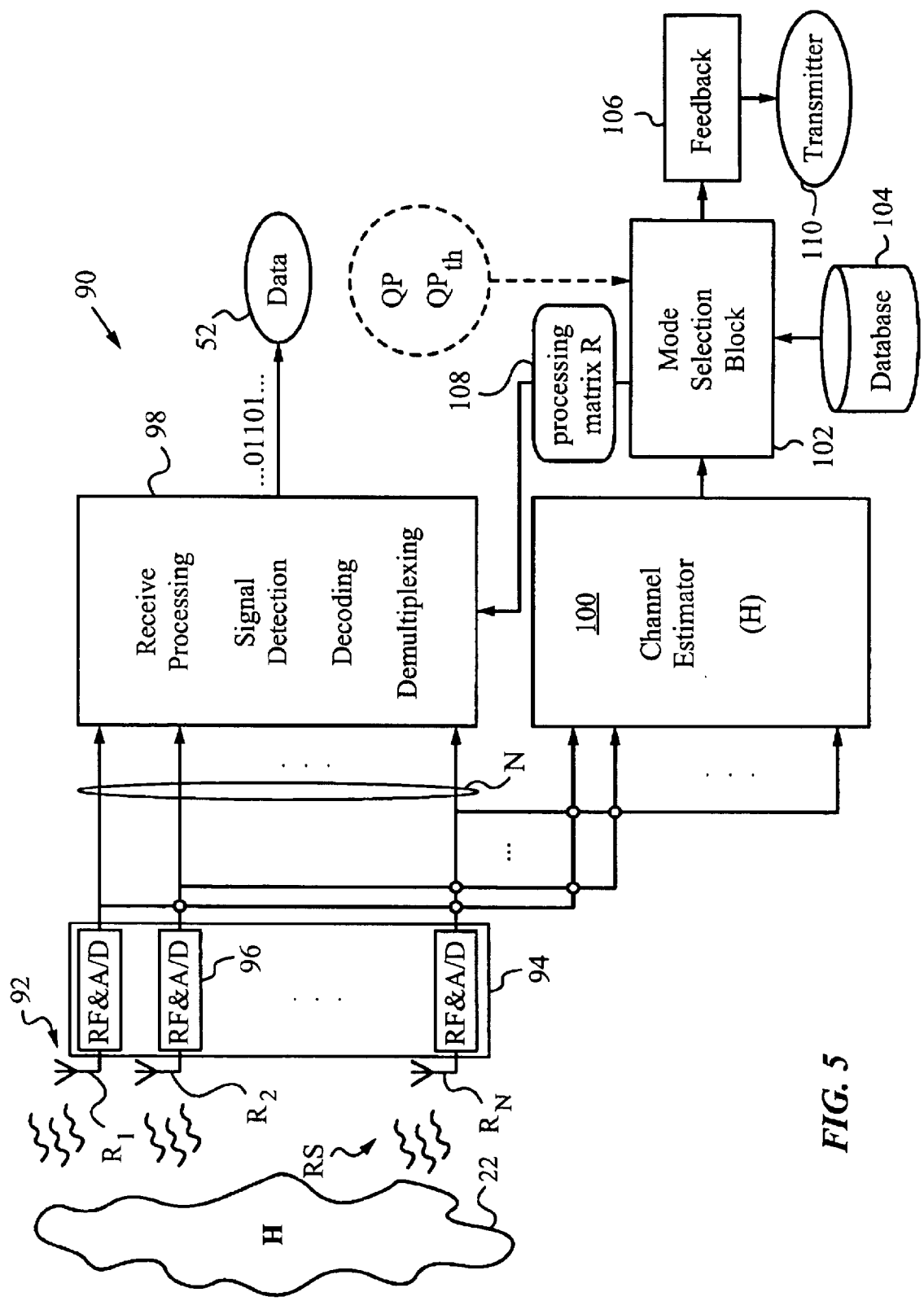
FIG. 5 is a block diagram of exemplary receive unit in accordance with the invention.

FIG. 5 illustrates receive unit 90 for receiving receive signals RS from transmit unit 50 through channel 22 with N receive antennas 92. Receive unit 90 can be any suitable receiver capable of receiving spatial multiplexed receive signals RS via the N receive antennas 92. Exemplary receivers include maximum likelihood receivers, zero forcing equalizer receivers, successive cancellation receivers and minimum mean square error equalizer receivers. Receive unit 90 has an RF amplification and down-conversion stage 94 having individual RF amplification/down-conversion/ and analog-to-digital converter blocks 96 associated with each of the N receive antennas 92. The N outputs of stage 94 are connected to a block 98 which performs receive processing, signal detection and decoding and demultiplexing functions. The N outputs of stage 94 are also connected to a channel estimator 100. Channel estimator 100 obtains a measurement of channel 22; in particular, it determines the channel coefficients matrix H representing the action of channel 22 on transmit signals TS.

Estimator 100 is connected to block 98 to provide block 98 with the channel descriptor. The channel descriptor is typically determined by estimator 100 during training; a procedure well-known in the art. In case there is no ISI estimator 100 determines channel matrix H for the independent k streams from the k transmit antennas 72. In case there is ISI estimator 100 determines channel matrix filter $\mathcal{H}$ with the aid of training sequences which are as long or longer than the delay spread. In multi-carrier operation each sub-carrier tone has a different channel so training is required for all sub-carrier tones. During training estimator 100 determines channel matrices $H_1, H_2, \ldots H_T$ for all sub-carrier tones. A deinterleaver and decoder (not shown) can be placed in the data stream if a corresponding interleaver and coder was employed in transmitter 50.

Channel estimator 100 is also connected to a mode selection block 102. Mode selection block 102 is connected to a database 104. Database 104 conveniently contains a look-up table similar to table 1 with quality parameters QP's and threshold values $QP_{th}$ (i.e., the lowest acceptable values) of these QP's for each of the modes. In other words, for any particular QP each mode has an associated threshold $QP_{th}$, which is conveniently stored in database 104. For example, when SINR is used as QP, then for a given (or required) performance criteria, e.g., a required BER, each mode has a threshold $SINR_{th}$ which depends on its modulation rate and coding rate. Mode selection block 102 can thus access in database 104 the appropriate threshold $QP_{th}$ values for the selected modes.

Alternatively, mode selection block 102 can receive quality parameter QP and threshold value $QP_{th}$ for each mode from an outside source. In yet another embodiment, block 102 can be pre-programmed to use a particular quality parameter QP or make its own selection of quality parameter QP. Also, threshold value $QP_{th}$ can be provided, or pre-set by block 102 or adjusted during operation by either block 102 or some other circuit, as necessary. In the present embodiment, signal-to-interference and noise ratio (SINR) is used as quality parameter QP.

Conveniently, database 104 contains the same entries as database 78 indexed by the same mode numbers. This arrangement makes it particularly easy for selection block 102 to communicate its mode selection for each transmit antenna $T_i$ to transmit unit 50 by sending the mode number. For example, selection block 102 provides transmit antenna number and mode to be used by that transmit antenna pairwise for feedback to transmit unit 50. In fact, antenna number and mode can be arranged in a table for feedback. When a transmit antenna number and corresponding mode are not indicated by block 102, then that transmit antenna $T_i$ is deactivated by controller 66. For active transmit antennas $T_i$ controller 66 retrieves the corresponding coding rate and modulation from database 78. Alternatively, selection block 102 can indicate directly which transmit antenna or antennas $T_i$ are to be deactivated and indicate the modes to be used by active transmit antennas $T_i$. In some cases, the same mode can be used by all active transmit antennas $T_i$, e.g., at system start-up. At this time selection block 102 only sends active transmit antennas and mode for feedback to transmit unit 50.

Mode selection block 102 is connected to a feedback block 106 for feeding back the antenna numbers and corresponding modes to receive unit 50. Furthermore, feedback block 106 can also send channel parameters, e.g., in the form of mode number to transmit unit 50. Receiver unit's 90 transmitter 110 is connected to feedback block 106 for transmitting this information back to transmit unit 50.

In this embodiment, receive unit 90 is a minimum mean square error equalizer (MMSE) receiver requiring a receive processing matrix 108 based on channel matrix H to recover data 52. Hence, mode selection block 102 has the appropriate logic to compute matrix 108 as discussed below. Block 102 communicates matrix 108 to block 98 via a link.

The operation of channel 22 on a transmit vector s of M transmit signals TS corresponding to the M transmit antennas 72 is described by the system equation:

$$x = RHs + Rv, \quad (1)$$

where v is an N×1 noise vector, H is the N×M channel matrix, R is the linear MMSE equalizer receiver and x is the N×1 receive vector estimated by receive unit 90. It is assumed that:

$$E(ss^*) = P_o; \ E(vv^*) = R_{vv}; \ E(sv^*) = 0 \quad (2)$$

where the superscript * denotes the conjugate transpose and E is the expectation value over the distributions of v and s. The error vector e can be defined as:

$$e = s - RHs - Rv. \quad (3)$$

The linear MMSE equalizer is found by minimizing the cost function:

$$C(R) = \text{Trace } E(ee^*). \quad (4)$$

Using the assumptions in (2), the cost function in (4) can be simplified to:

$$C(R) = \text{Trace}[P_o(I-RH)(I-RH)^* + RR_{vv}R^*], \quad (5)$$

where I is the identity matrix. To obtain the optimum MMSE receiver, $R_{opt}$, the first derivative of the simplified cost function is set to zero, $$\frac{\partial C(R)}{\partial R} = 0,$$

and solved for $R_{opt}$ yielding:

$$R_{opt} = P_o H^* (P_o HH^* + R_{vv})^{-1}. \quad (6)$$

The receiver R, here optimized receiver $R_{opt}$, determines the value of quality parameter QP for transmit signals TS transmitted via each one of transmit antennas 72. In this embodiment, signal-to-interference and noise ratio (SINR) is chosen as the quality parameter QP. The relation between $SINR_i$ for i-th of transmit antennas 72 and $R_{opt}$ is:

$$SINR_i = \frac{P_o}{|C(R_{opt})|_{ii}}. \quad (7)$$

Of course, a person of average skill in the art will be able to construct analogous relationships between other quality parameters QP of transmit signals TS transmitted from each of transmit antennas 72 and the receiver.

In accordance with the method of the invention, a threshold value $QP_{th}$ is assigned to quality parameter QP. The assignment of the threshold is based on the desired quality of receive signals RS. Conveniently, $QP_{th}$ is the minimum threshold at which receive signals RS can be re-converted into data 52 by block 98 at an acceptable error rate given the mode (coding rate and modulation of data 52 employed by spatial multiplexing block 56 of transmit unit 50). For example, the assignment can be based on a desired bit-error-rate (BER) of received data 52. Alternatively, other error rates such as packet error rates or symbol error rates of data 52 can be used to characterize the quality of receive signals RS. A person of average skill in the art is familiar with these characterizations and criteria for their selection.

In this embodiment, data 52 is coded and modulated in accordance with a square QAM constellation (e.g. with four points, Z=4) and the quality parameter QP is SINR. The BER required at receive unit 90 given this mode assigns the minimum threshold $SINR_{th}$. Specifically, $BER_i$ at receive unit 90 for data 52 transmitted in transmit signals TS from i-th antenna of transmit antennas 72 is related to $SINR_i$ for the i-th antenna as follows:

$$BER_i = \alpha_z \times erfc(\sqrt{\beta_z SINR_i}), \tag{8}$$

where erfc is the complementary error function, $$\alpha_z = \frac{2}{\log_2 Z}\left(1 - \frac{1}{\sqrt{Z}}\right),$$

and $$\beta_z = \frac{3}{2(Z-1)}.$$

Selecting a minimum acceptable $BER_i$ at receive unit 90 given the mode thus yields an $SINR_i$ value to be used as threshold value $SINR_{th}$. It should be noted that this holds for uncoded schemes, i.e., when no additional coding such as error coding is imposed on data 52. In the event such coding is used there is generally a coding gain which will vary $SINR_{th}$, as will be appreciated by a person skilled in the art.

$SINR_{th}$ is used by mode selection block 102 to identify sub-descriptors of channel 22 which do not meet threshold $SINR_{th}$. In this embodiment the sub-descriptors of channel 22 are sub-matrices $h_i$ of channel matrix H, as shown in FIG. 6. One sub-matrix $h_i$, i=1 . . . M, is associated with each transmit antenna $T_i$, i=1 . . . M, of transmit antennas 72. The schematic of FIG. 6 illustrates a case where for all sub-matrices $h_i$ quality parameter QP exceeds threshold $QP_{th}$ with the exception of sub-matrix $h_j$. In the present embodiment QP is SINR and thus $SINR_j<SINR_{th}$.

According to the method of the invention, transmit antenna $T_j$ corresponding to sub-matrix $h_j$ is deactivated. In fact, transmit unit 50 is shown in FIG. 3 with antenna $T_j$ deactivated, i.e., no transmit signals TS are transmitted from antenna $T_j$. This deactivation of one or more transmitting antennas $T_i$ will generally improve and not worsen the quality parameter QP, in this case SINR, for the remaining transmitting antennas.

Figure 7:
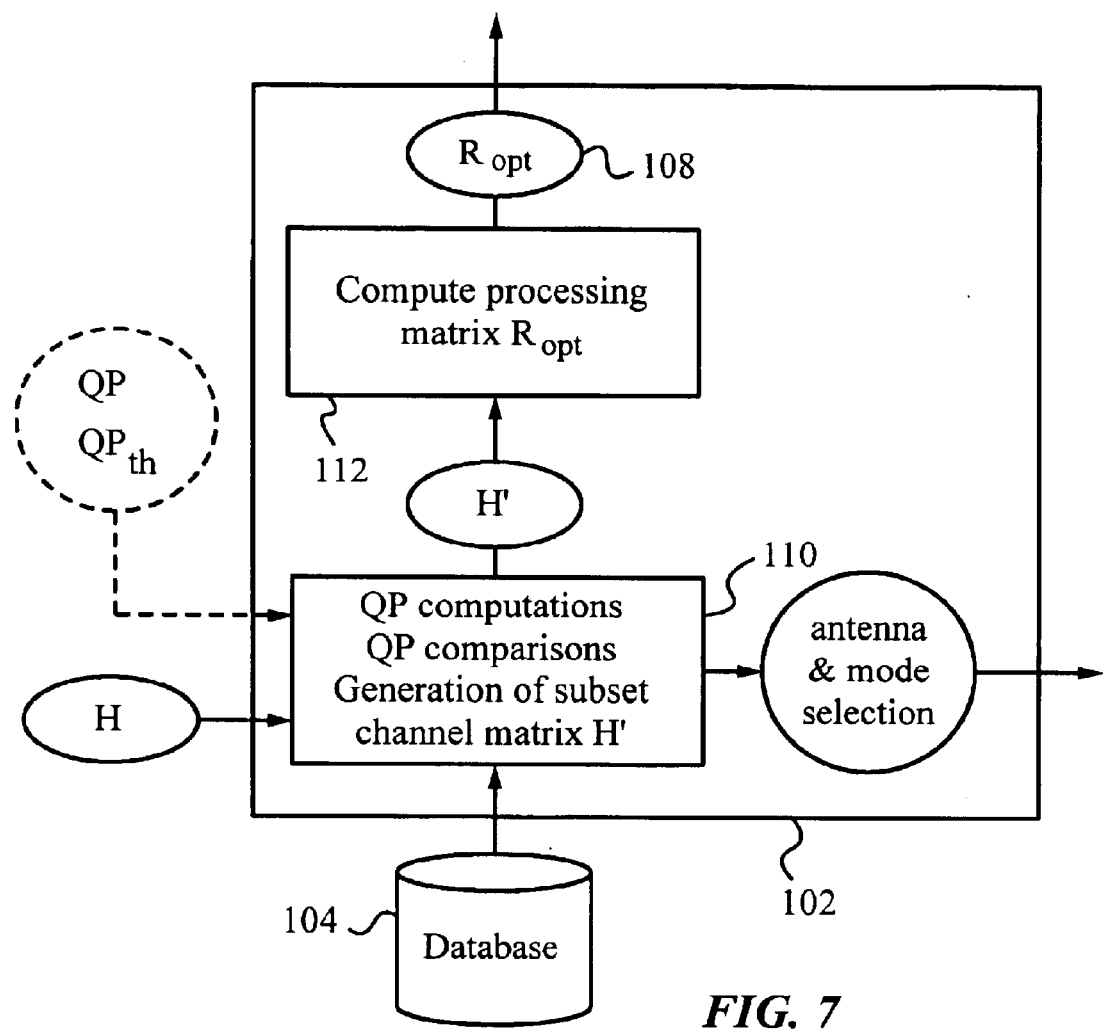
FIG. 7 is a block diagram of a mode selection block of the receive unit of FIG. 5.

FIG. 7 illustrates how mode selection block 102 implements the deactivation decision. Channel matrix H, QP and $QP_{th}$ are received by a comparison block 110 where QP values for each sub-matrix $h_i$ are compared with $QP_{th}$ given the selected mode (see FIG. 6). Comparison block 110 identifies which of sub-matrices $h_i$ has a $QP_i$, less than $QP_{th}$ and removes this sub-matrix, in the present embodiment sub-matrix $h_j$, since $QP_j<QP_{th}$, from channel matrix H. Removal of sub-matrix $h_j$ from channel matrix H produces a subset channel matrix H'. Comparison block 110 recomputes $QP_i$ for each sub-matrix $h_i$ corresponding to transmit antenna $T_i$ in subset matrix H'. Conveniently, recomputed $QP_i$ of sub-matrices $h_i$ of subset channel matrix H' are compared with adjusted $QP_{th}$. For example, recomputed $QP_i$ are compared with $QP_{th}$ required for particular modes to determine in which of those modes the corresponding antennas $T_i$ should transmit. Advantageously, the mode whose required $QP_{th}$ is closest in value to the recalculated $QP_i$ is selected for data 52 transmitted from corresponding transmit antenna $T_i$.

Block 110 also passes subset channel matrix H' to a computing block 112. Computing block 112 calculates the processing matrix 108 or optimal receiver $R_{opt}$ and sends $R_{opt}$ to block 98 for receive processing.

When all transmit antennas $T_i$ meet threshold $QP_{th}$ of a different mode then employed at the time, e.g., a mode with a higher throughput, then this higher throughput mode is selected by comparison block 110. When a sub-matrix $h_j$ indicates that the corresponding transmit antenna $T_j$ no longer meets $QP_{th}$, then that antenna is deactivated and the mode is fed back to transmit unit 50. In this manner, transmission of data 52 can be optimized for highest throughput at the set $QP_{th}$.

Figure 8:
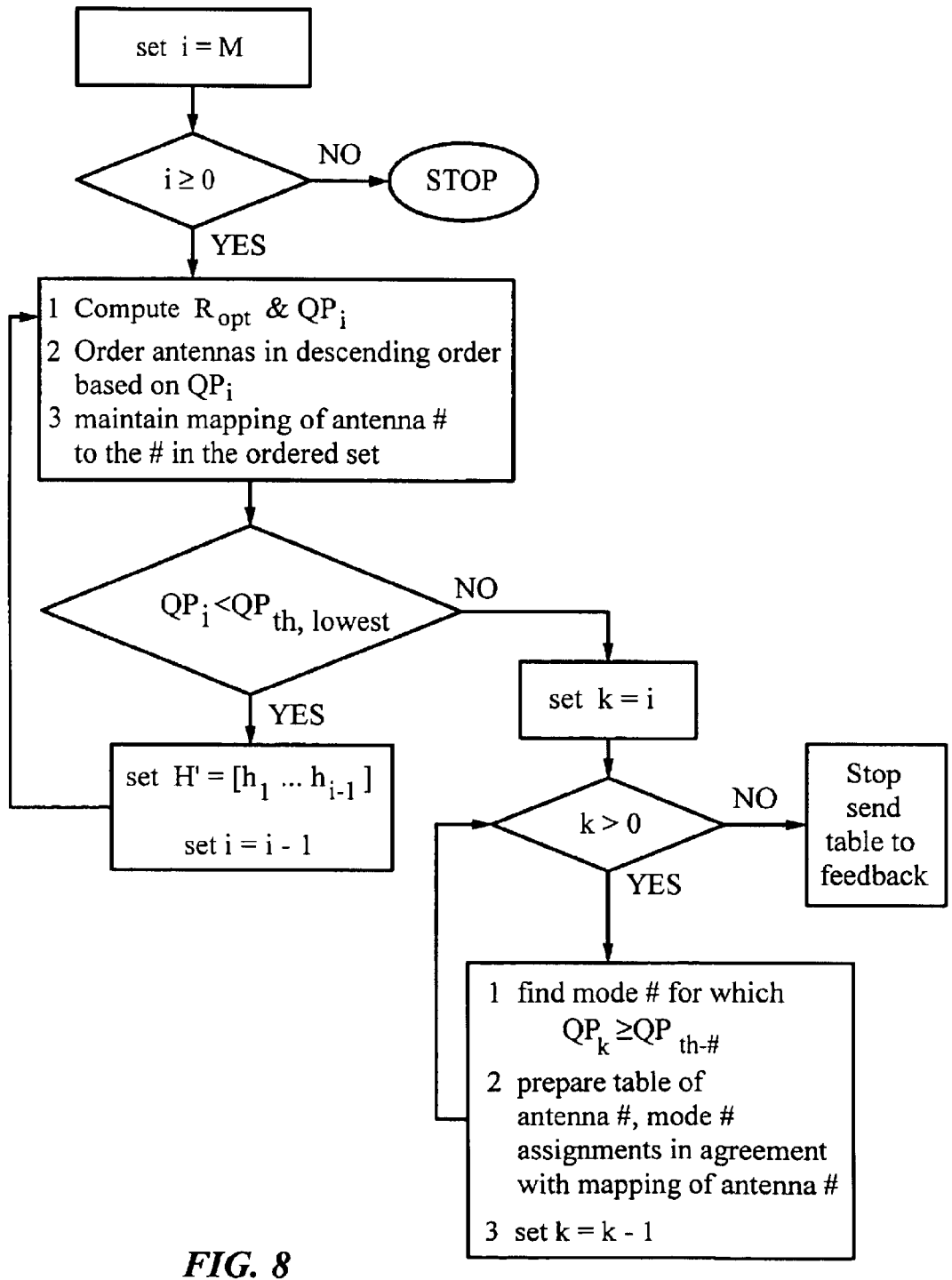
FIG. 8 is an exemplary flow chart of the method of the invention.

In fact, flow chart of FIG. 8 shows an embodiment of the method for achieving highest throughput a mode number # with corresponding threshold $QP_{th-\#}$. Initially, i is set equal to the number of transmit antennas $T_i$, i=M, such that k=M. Then, optimal receiver $R_{opt}$ is computed as well as the values $QP_i$ for all sub-matrices $h_i$. For convenience, antennas $T_i$ and their corresponding sub-matrices $h_i$ are arranged in descending order of $QP_i$. A mapping of this re-arranged or ordered set to the original order of sub-matrices $h_i$ and corresponding transmit antennas $T_i$ is maintained for administrative purposes.

In the next step, each $QP_i$ is compared with a lowest threshold $QP_{th-\#}$. For example, lowest threshold $QP_{th-\#}$ can be equal to the threshold for the lowest throughput acceptable mode #. When a $QP_i$ does not meet this lowest threshold $QP_{th-\#}$, the corresponding sub-matrix $h_i$ is removed from channel matrix H to produce subset channel matrix H'. With the same action the corresponding antenna $T_i$ is designated for deactivation. After removal of sub-matrix $h_i$ the values of $QP_i$ are re-computed and the comparison repeated, until subset channel matrix H' contains only sub-matrices $h_i$ which have $QP_i$ higher than $QP_{th-\#}$ It should be noted that more than one sub-matrix $h_i$ can be removed at a time.

Once the final subset channel matrix H' is obtained it is sent to the second branch in the flow chart of FIG. 8 to determine the best modes to use for transmission from the remaining antennas. The number of data streams k is set to the number of remaining sub-matrices $h_i$, i=k. Then, in a recursive loop process, the best mode number for each antenna is determined by direct comparison of $QP_k$ with $QP_{th-\#}$ required for that mode #. The mode # for which the comparison yields the closest match is selected for transmission from corresponding antenna #. Conveniently, the antenna # and mode # are ordered pairwise in a table for feedback to the transmit unit. Before feedback, the table is arranged to agree with the updated mapping of antenna # which was performed to arrange sub-matrices $h_i$ in descending order of $QP_i$.

It should be noted, that comparison block 110 can re-set or adjust lowest $QP_{th-\#}$. For example, when data 52 is not very sensitive (e.g., voice) lowest $QP_{th-\#}$ can be lowered and when data 52 is sensitive lowest threshold $QP_{th-\#}$ can be raised. In fact, the setting of lowest $QP_{th-\#}$ depends on the type of data 52 and other parameters well-known in the art of data processing.

Comparison block 110 can repeat the steps of identifying individual or even groups or sets of sub-matrices $h_i$ falling below lowest $QP_{th-\#}$ and deactivate the corresponding antenna or antennas among transmit antennas 72. Of course, when channel 22 is very high quality, no transmit antennas 72 may need to be deactivated.

In general, the time period within which the above computations for antenna deactivation should be repeated should be shorter than the coherence time of channel 22.

In another embodiment, transmit unit 50 receiving feedback of channel information, whether using TDD or simple feedback, could make the selection of antenna or antennas to deactivate on its own. This alternative approach would be convenient when receive unit 90 does not have sufficient resources or power to make the comparisons between the values of $QP_i$ and $QP_{th}$. Of course, transmit unit 50 would then contain all the corresponding computation and decision-making blocks, specifically mode selection block 102, contained in receive unit 90 as described above.

Figure 9:
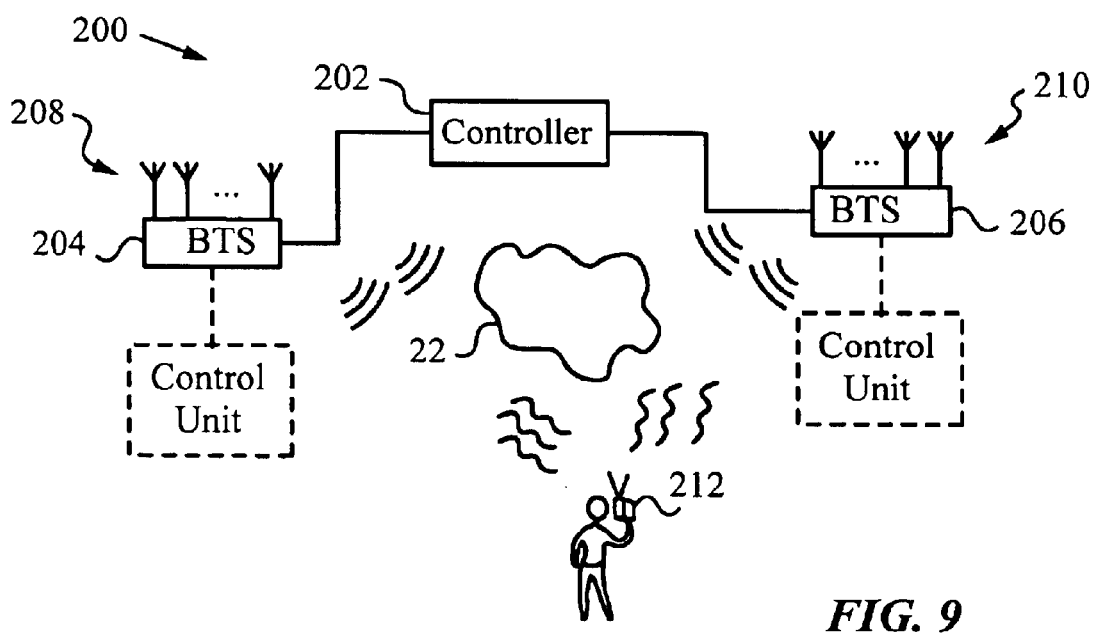
FIG. 9 is a diagram of another embodiment of the invention.

In an alternative embodiment shown in FIG. 9, the method of invention is employed in a communications system 200 using spatial-multiplexing. System 200 has several base transceiver stations (BTS), of which two 204, 206 are shown. BTS 204, 206 are equipped with transmit antenna arrays 208, 210 respectively for sending transmit signals to receive unit 212. It should be noted, however, that a combination of BTS with single transmit antennas can be used as long as spatial multiplexing is employed.

Receive unit 212 sets a threshold $QP_{th}$ and identifies among the sub-descriptors of a descriptor of channel 22, e.g., $h_i$ matrices of channel matrix H, one or more sub-descriptors which do not meet threshold $QP_{th}$ in the selected mode. As described above, receive unit 212 can adjust threshold $QP_{th}$, in particular, it can adjust threshold $QP_{th}$ based on the desired mode. Receive unit 212 then determines a final selection which transmit antennas of transmit antenna arrays 208, 210 should be deactivated. Additionally, receive unit 212 determines which modes should be used by the remaining active transmit antennas of arrays 208, 210. It should be noted that under certain circumstances receive unit 212 may determine that one of base stations 204, 206 should not be transmitting any transmit signals to receive unit 212 at all.

The selection of antennas and modes is fed back from receive unit 212 to BTS 204, 206. In particular, a control logic, in this embodiment a controller 202 receives the feedback from receive unit 212. Controller 202 can be a central control unit supervising the operation of BTS 204, 206 and any other BTS of communication system 200. Alternatively, control logic can consist of separate control units as indicated in dashed lines.

In another embodiment of the invention, the descriptor of channel 22 is a channel matrix filter $\mathcal{H}$ and sub-descriptors are sub-matrix filters $h_i$. Conveniently, channel matrix filter $\mathcal{H}$ is used as descriptor when inter-symbol interference (ISI) is present due to broadly varying times of arrival or under other adverse conditions associated with delay spread. A person of average skill in the art is familiar with channel matrix filters $\mathcal{H}$, their construction and their use in reconstructing transmitted data under such channel conditions.

In particular, for a channel with delay spread the system equation is:

$$X = \mathcal{H} S + N. \quad (9)$$

This equation can be rewritten in matrix form as:

$$\begin{pmatrix} x_k \\ x_{k-1} \\ \vdots \\ x_{k-q+1} \end{pmatrix} = \begin{matrix} 1 \\ 2 \\ \vdots \\ q \end{matrix} \begin{pmatrix} H_o & H_1 \ldots H_L & 0 & \ldots & 0 \\ 0 & H_o & H_1 \ldots H_L & & 0 \\ \vdots & \vdots & . & . & . \\ 0 & 0 & \ldots & H_o \ldots H_L \end{pmatrix} \begin{pmatrix} s_k \\ s_{k-1} \\ \vdots \\ s_{k-p+1} \end{pmatrix} + \begin{pmatrix} n_k \\ n_{k-1} \\ \vdots \\ n_{k-p+1} \end{pmatrix},$$

where $s_k$ is the signal vector at time $k$, $n_k$ is the noise vector at time $k$, $x_k$ is the received signal vector at time $k$, q is the number of received signal snap shots used for processing (also referred to as the number of equalizer taps), L is the number of delay elements in the channel and $p \geq q+L$. As is clear from the explicit system equation, channel matrix filter $\mathcal{H}$ actually consists of a number of channel matrices H, each of which is an N×M matrix, where N is the number of receive antennas at the receive unit and M is the number of transmit antennas.

Therefore, channel matrix filter H is actually qN×pM. In fact, M is the total number of antennas from which receive unit is meant to receive spatially multiplexed signals. As discussed above, these transmit antennas can belong to separate BTS, include single transmit antennas or transmit antennas which are part of any suitable transmit antenna array.

The receiver equalizer R(z) for processing the q time snap shots of the received vector $x_k$ to obtain a good MMSE estimator of the transmitted signal vector $s_k$ can be represented as follows:

$$R(z) = \sum_{i=0}^{q-1} R_i z^{-i}, \quad (10)$$

where z is the delay element, $R_i$ is the equalizer tap at the i-th instant. Using system equation (9) and equation (10) the recovered signal vector, $\hat{s}_k$, where the hat indicates recovered signal, can be written as:

$$\hat{s}_k = [R_o, R_1 \ldots R_{q-1}] \mathcal{H} S + [R_o, R_1 \ldots R_{q-1}] N. \quad (11)$$

By defining the following correlation matrices:

$$E[NN^*] = \sigma^2 I \quad (12)$$

$$E[SS^*] = I, \quad (13)$$

where $\sigma^2$ is the noise variance and I is the identity matrix, the MMSE estimator R for estimating $\hat{s}_k$ from S can be written as:

$$R = [H_o^* 0 0 \ldots ](\mathcal{H} \mathcal{H}^* + \sigma^2)^{-1}. \quad (14)$$

In this embodiment the quality parameter QP is chosen to be signal-to-noise ratio (SNR). Now, for the i-th transmit antenna the SNR is given by:

$$SNR_i = \frac{1}{\sigma^2} [R \mathcal{H} \mathcal{H}^* R^*]_{ii}, \quad (15)$$

where i=1, 2, . . . M. At this point the SNR values for each transmit antenna can be compared with a threshold $SNR_{th}$. The remaining steps leading to the selection of which transmit antenna should be deactivated are analogous to those described above.

The method of invention can also be used in multi-carrier systems using spatial multiplexing. In these types of communication systems several sub-carrier frequencies or sub-carrier tones are transmitted from each transmit antenna. Each of these sub-carrier tones experiences a different channel in propagating from the transmit unit to the receive unit. Hence, each transmit antenna has associated with it a group of sub-descriptors; one for each sub-carrier tone.

In this case each transmit antenna and its associated sub-descriptor will yield a different quality parameter QP at the different sub-carrier frequencies. In other words, data transmitted from a transmit antenna $T_j$ on a first sub-carrier tone $ST_1$ will exhibit a quality parameter $QP_{j1}$ different from a quality parameter $QP_{j2}$ for data transmitted from the same transmit antenna $T_j$ on a second sub-carrier tone $ST_2$. Hence, the selection of which transmit antenna to deactivate in this case is made based on the average quality parameter $QP_j$ for the group of sub-descriptors associated with that antenna. With this change, the method of invention can be employed in multi-carrier systems as described for non multi-carrier communication systems.

The method of the invention can be used in soft hand-off between base stations in cellular systems. Alternatively, partial hand-offs or gradual hand-offs between base stations can be implemented, depending on antenna selection. In fixed wireless systems the user device can operate by receiving signals from a selection of antennas belonging to different base stations at all times. Also, in the case of fixed wireless devices there may be cases where the channel does not change appreciably over time. In this case, once the antenna selection is made, no feedback may be required.

It will be clear to one skilled in the art that the above embodiments may be altered in many ways without departing from the scope of the invention. Accordingly, the scope of the invention should be determined by the following claims and their legal equivalents.

What is claimed is:

1. A method for selecting antennas for spatial multiplexed communication in a channel for transmitting data between a transmit unit having transmit antennas and a receive unit having receive antennas, said method comprising:
   a) determining a channel descriptor having sub-descriptors corresponding to said transmit antennas;
   b) choosing a quality parameter;
   c) assigning a threshold to said quality parameter;
   d) identifying among said sub-descriptors a sub-descriptor not meeting said threshold; and
   e) deactivating among said transmit antennas an antenna associated with said sub-descriptor, wherein said channel descriptor is a channel matrix H and said sub-descriptors are sub-matrices $h_j$, and said sub-descriptor is a sub-matrix $_j$ of the channel matrix, and wherein said deactivating comprises removing at least one of the sub-matrix $h_j$ to obtain a subset channel matrix H'.

2. The method of claim 1, wherein said quality parameter is selected from a group consisting of signal-to-interference and noise ratio, signal-to-noise ratio, and power level.

3. The method of claim 1, wherein said spatial multiplexed communication employs a number of sub-carrier tones associating groups of said sub-descriptors with said transmit antennas.

4. The method of claim 3, wherein said identifying comprises computing an average quality parameter for said groups of sub-descriptors and identifying among said groups of sub-descriptors a group of sub-descriptors not meeting said threshold, and said deactivating comprises deactivating among said transmit antennas an antenna associated with said group of sub-descriptors.

5. The method of claim 1, further comprising repeating said identifying and said deactivating.

6. The method of claim 1, further comprising adjusting said threshold.

7. The method of claim 1, wherein said data is coded and modulated in accordance with a selected mode.

8. The method of claim 7, wherein said mode comprises a predetermined coding rate and modulation.

9. The method of claim 7, wherein said threshold is assigned based on said selected mode.

10. The method of claim 7, wherein said selected mode is based on said quality parameter.

11. The method of claim 7, wherein said selected mode is fed back to said transmit unit.

12. The method of claim 1, wherein said receive unit is selected from the group consisting of maximum likelihood receivers, zero forcing equalizer receivers, successive cancellation receivers and minimum mean square error equalizer receivers.

13. A method for selecting antennas for spatial multiplexed communication in a channel for transmitting data between a transmit unit having transmit antennas and a receive unit having receive antennas, said method comprising:
   a) determining a channel descriptor having sub-descriptors corresponding to said transmit antennas, wherein said channel descriptor is a channel matrix filter H, said sub-descriptors are sub-matrix filters $h_i$ of said channel matrix filter H, and said set of sub-descriptor is a set of sub-matrix filters $h_i$;
   b) choosing a quality parameter;
   c) assigning a threshold to said quality parameter;
   d) identifying among said sub-descriptors a set of sub-descriptors not meeting said threshold; and
   e) deactivating among said transmit antennas, antennas associated with said set of sub-descriptors by removing said set of sub-matrix filters $h_i$ from said channel matrix filter H to obtain a subset channel matrix filter H'.

14. The method of claim 13, wherein said quality parameter is selected from the group consisting of signal-to-interference and noise ratio, signal-to-noise ratio, and power level.

15. The method of claim 13, further comprising repeating said identifying and said deactivating.

16. The method of claim 13, wherein said spatial multiplexed communication employs a number of sub-carrier tones associating groups of said sub-descriptors with said transmit antennas.

17. The method of claim 16, wherein said identifying comprises computing an average quality parameter for said groups of sub-descriptors and identifying among said groups of sub-descriptors a set of groups of sub-descriptors not meeting said threshold, and said deactivating comprises deactivating among said transmit antennas a set of antennas associated with said set of groups of sub-descriptors.

18. The method of claim 13, further comprising adjusting said threshold.

19. The method of claim 13, wherein said data is coded and modulated in accordance with a selected mode.

20. The method of claim 19, wherein said mode comprises a predetermined coding rate and modulation.

21. The method of claim 19, wherein said threshold is assigned based on said selected mode.

22. The method of claim 19, wherein said selected mode is based on said quality parameter.

23. The method of claim 19, wherein said selected mode is fed back to said transmit unit.

24. The method of claim 13, wherein said receive unit is selected from the group consisting of maximum likelihood receivers, zero forcing equalizer receivers, successive cancellation receivers and minimum mean square error equalizer receivers.

25. A method for selecting antennas for spatial multiplexed communication in a channel for transmitting data between transmit antennas and a receive unit having an array of receive antennas, said method comprising:
   a) determining a channel descriptor having sub-descriptors corresponding to said transmit antennas, said channel descriptor being a channel matrix H, said sub-descriptors are sub-matrices $h_i$ of said channel matrix H, and said sub-descriptor is a sub-matrix $h_j$;

b) choosing a quality parameter;

c) assigning a threshold to said quality parameter;

d) identifying among said sub-descriptors a sub-descriptor not meeting said threshold; and e) deactivating among said transmit antennas an antenna associated with said sub-descriptor, said deactivating including removing said sub-matrix $h_j$ from said channel matrix H to obtain a subset channel matrix H'.

26. The method of claim 25, wherein said quality parameter is selected from a group consisting of signal-to-interference and noise ratio, signal-to-noise ratio, and power level.

27. The method of claim 25, wherein said spatial multiplexed communication employs a number of sub-carrier tones associating groups of said sub-descriptors with said transmit antennas.

28. The method of claim 27, wherein said identifying comprises computing an average quality parameter for said groups of sub-descriptors and identifying among said groups of sub-descriptors a group of sub-descriptors not meeting said threshold, and said deactivating comprises deactivating among said transmit antennas an antenna associated with said group of sub-descriptors.

29. The method of claim 25, further comprising repeating said identifying and said deactivating.

30. The method of claim 25, further comprising adjusting said threshold.

31. The method of claim 25, wherein said selected mode is based on said quality parameter.

32. The method of claim 25, wherein said receive unit is selected from the group consisting of maximum likelihood receivers, zero forcing equalizer receivers, successive cancellation receivers and minimum mean square error equalizer receivers.

33. A system for spatial multiplexed communication in a channel for transmitting data between a transmit unit having transmit antennas and a receive unit having receive antennas, said receive unit comprising:

a) a channel estimation block for determining a channel descriptor having sub-descriptors corresponding to said transmit antennas, said channel descriptor being a channel matrix H, said sub-descriptors are sub-matrices $h_i$ of said channel matrix H, and said sub-descriptor is a sub-matrix $h_j$;

b) a mode selection block for receiving a quality parameter, assigning a threshold to said quality parameter, and identifying among said sub-descriptors at least one sub-descriptor not meeting said threshold;

c) a feedback unit for sending feedback related to said at least one sub-descriptor to said transmit unit; and said transmit unit comprising a control logic for receiving said feedback and deactivating among said transmit antennas, antennas associated with said at least one sub-descriptor, said deactivating including removing said sub-matrix $h_j$ from said channel matrix H to obtain a subset channel matrix H'.

34. The system of claim 33, wherein said transmit unit further comprises a spatial multiplexing block connected to said control logic for coding and multiplexing said data.

35. The system of claim 33, wherein said transmit unit further comprises a switching unit for deactivating said antennas.

36. The system of claim 33, wherein said receive unit is selected from the group consisting of maximum likelihood receivers, zero forcing equalizer receivers, successive cancellation receivers and minimum mean square error equalizer receivers.

37. A system for spatial multiplexed communication in a channel for transmitting data between a number of transceivers having transmit antennas and a receive unit having receive antennas, said receive unit comprising:

a) a channel estimation block for determining a channel descriptor having sub-descriptors corresponding to said transmit antennas, said channel descriptor being a channel matrix H, said sub-descriptors are sub-matrices $h_i$ of said channel matrix H, and said sub-descriptor is a sub-matrix $h_j$;

b) a mode selection block for receiving a quality parameter, assigning a threshold to said quality parameter, and identifying among said sub-descriptors at least one sub-descriptor not meeting said threshold;

c) a feedback unit for sending feedback related to said at least one sub-descriptor to said transmit unit; and said number of transceivers comprising a control logic for receiving said feedback and deactivating among said transmit antennas, antennas associated with said at least one sub-descriptor, said deactivating including removing said sub-matrix $h_j$ from said channel matrix H to obtain a subset channel matrix H'.

38. The system of claim 37, wherein said transceivers further comprise spatial multiplexing blocks for coding and multiplexing said data.

39. The system of claim 37, wherein said transceivers further comprise switching units for deactivating said antennas.

40. The system of claim 37, wherein said receive unit is selected from the group consisting of maximum likelihood receivers, zero forcing equalizer receivers, successive cancellation receivers and minimum mean square error equalizer receivers.

41. The system of claim 37, wherein said control logic comprises a number of control units.

42. The system of claim 41, wherein each of said transceivers has one of said control units.

* * * * *

UNITED STATES PATENT AND TRADEMARK OFFICE
CERTIFICATE OF CORRECTION

PATENT NO. : 6,922,445 B1
DATED : July 26, 2005
INVENTOR(S) : Sampath et al.

It is certified that error appears in the above-identified patent and that said Letters Patent is hereby corrected as shown below:

Column 6,
Line 34, delete "terrors" and insert -- errors --.

Column 8,
Line 19, delete "59" and insert -- 58 --.

Signed and Sealed this

Sixth Day of December, 2005

JON W. DUDAS
*Director of the United States Patent and Trademark Office*